UNITED STATES PATENT OFFICE.

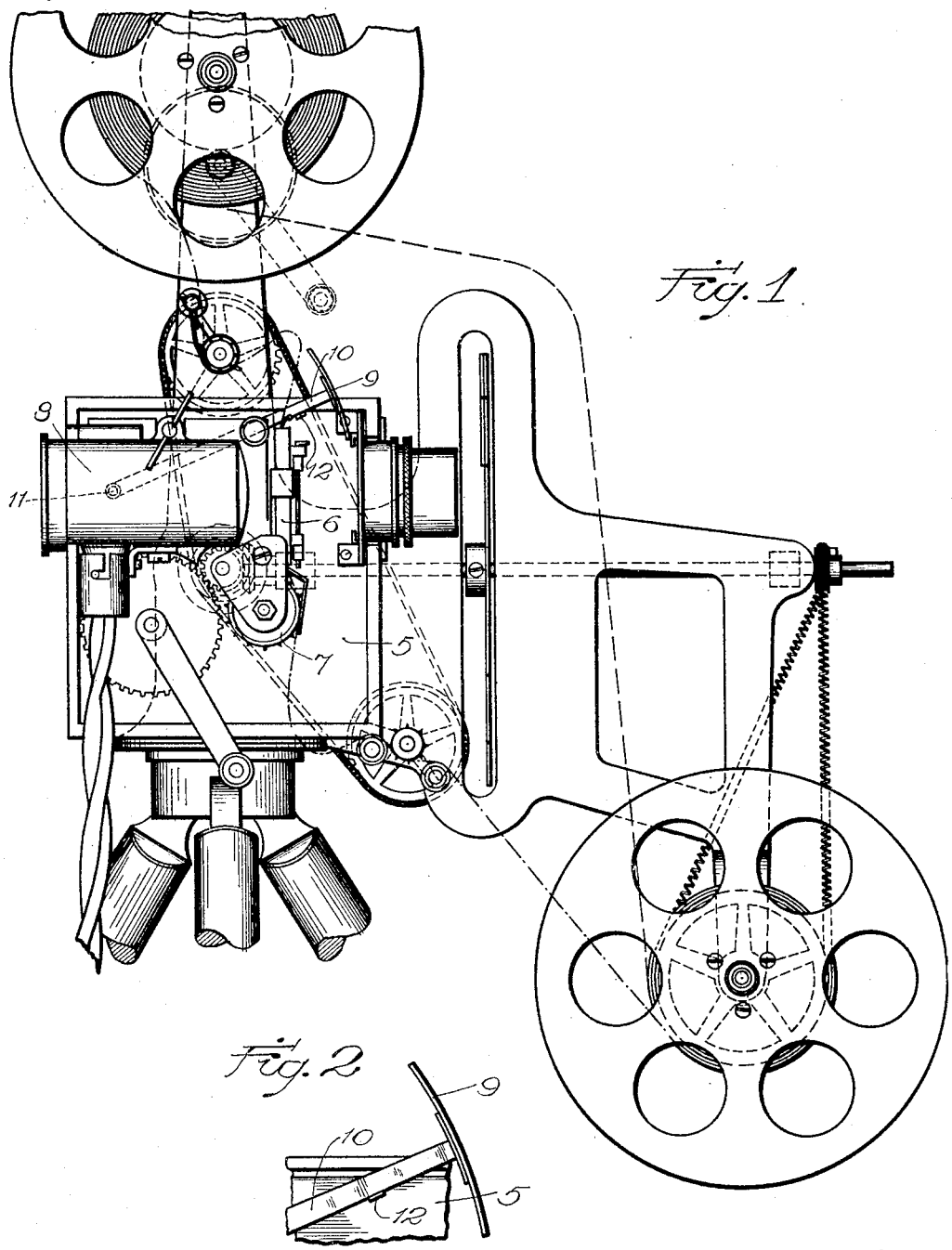

VARIAN M. HARRIS, OF CHICAGO, ILLINOIS, ASSIGNOR TO KLIX MANUFACTURING COMPANY, OF CHICAGO, ILLINOIS, A CORPORATION OF ILLINOIS.

SHUTTER-SUPPORT FOR CAMERAS.

1,323,762.      Specification of Letters Patent.      Patented Dec. 2, 1919.

Original application filed March 1, 1918, Serial No. 219,797. Divided and this application filed June 24, 1918.
Serial No. 241,703.

*To all whom it may concern:*

Be it known that I, VARIAN M. HARRIS, a citizen of the United States, residing at Chicago, in the county of Cook and State of Illinois, have invented a certain new and useful Improvement in Shutter-Supports for Cameras, of which the following is a full, clear, concise, and exact description, reference being had to the accompanying drawings, forming a part of this specification.

This invention relates to combined motion picture camera and projector, and is especially concerned with improvements in the mechanism illustrated and described in my co-pending application Serial No. 195,040, filed October 6, 1917.

The objects of my present invention are:

1st. To simplify and improve in general the construction of the machine disclosed in my co-pending application above referred to.

2nd. To provide novel means for holding the taking shutter in an inoperative position when the camera is being used for projecting pictures.

Other objects will definitely appear as the description progresses, reference being had to the accompanying drawings in which, Figure 1 is a side elevation showing my improved motion picture camera in combination with means for converting it into a projector; and Fig. 2 is a fragmentary elevation showing the means which I employ for holding the taking shutter in its inoperative position while the camera is being used for projecting the pictures.

Similar characters of reference refer to similar parts throughout the several views.

In the accompanying drawings I have illustrated only those portions of the structure illustrated and described in the application above referred to which are necessary to give a clear understanding of the relation between my improvements and the parts with which they coöperate in the prior structure.

In my co-pending application above referred to I have described a motion picture camera and means for converting the camera into a projecting apparatus to project the pictures taken by the motion picture camera. Among other things described in said application are means for holding the taking shutter in an inoperative position when the apparatus is being used to project the motion pictures.

My present invention is concerned with improved means for holding the taking shutter in its inoperative position during the projecting operation.

Referring to the drawings the reference character 5 indicates the frame plate of the cabinet which supports the film chute indicated as a whole by the reference character 6, the film sprockets 7, the illuminating unit 8, and certain driving mechanism which need not be described in detail as it is fully illustrated and described in my co-pending application above referred to, and also in my co-pending application Serial No. 219,797, filed March 1, 1918, of which this application is a division. The taking shutter 9 is secured to an arm 10 pivotally mounted at the point 11 upon the frame plate 5, and suitable mechanism described in the applications above referred to is provided for oscillating the arm 10. When it is desired to use the apparatus for projecting pictures, it is necessary to hold the shutter 9 in an inoperative position. For this purpose I provide a lug 12 which may be struck out of the plate 5 or otherwise secured thereto, and which projects outwardly beyond the plane of the arm 10, which supports the shutter 9. This lug is so positioned that when the arm 10 rests thereupon the shutter 9 will be held in its inoperative position. To place the arm 10 in this position it is merely necessary to spring the arm 10 outwardly, raise it above the lug 12, and then release it, whereupon it will spring into position above the lug 12 and be supported thereby.

While I have described the preferred embodiment of my invention it is to be understood that it is capable of other adaptations and modifications within the scope of the appended claims.

Having thus described my invention, what I claim as new and desire to secure by Letters Patent of the United States is:

1. A motion picture machine comprising a frame plate, a film chute, a lens support in front of said film chute, a shutter, means for oscillating said shutter between said film chute and lens support comprising an oscillating arm, and a lug pressed from said plate and extending beyond the plane of said arm, the said lug being positioned above the point to which the arm is normally actuated.

2. A motion picture machine comprising a film chute, a lens support, a shutter, means for oscillating said shutter comprising an arm pivoted at one end and secured to the shutter at its other end, and means positioned beyond the point to which the arm is actuated by said oscillating means for engaging said arm between its pivot point and the shutter for holding it in an inoperative position.

In witness whereof, I hereunto subscribe my name this 16th day of April, 1918.

VARIAN M. HARRIS.

Witnesses:
   MARY A. COOK,
   ALBIN C. OHLBERG.